United States Patent
Tuflija et al.

(10) Patent No.: US 8,239,282 B2
(45) Date of Patent: Aug. 7, 2012

(54) PURCHASER CENTERED, PRODUCT DRIVEN WORLD WIDE WEB SEARCHING AND E-COMMERCE SYSTEM

(76) Inventors: Todd Tuflija, Spokane, WA (US); John Janzen, Spokane, WA (US)

( * ) Notice: Subject to any disclaimer, the term of this patent is extended or adjusted under 35 U.S.C. 154(b) by 382 days.

(21) Appl. No.: 12/586,917

(22) Filed: Sep. 28, 2009

(65) Prior Publication Data

US 2011/0078045 A1 Mar. 31, 2011

(51) Int. Cl.
*G06Q 30/00* (2012.01)
*G06F 17/30* (2006.01)

(52) U.S. Cl. .......... 705/26.41; 705/26.1; 705/26.44; 705/26.7; 705/27.1; 707/706; 707/728; 707/732; 707/733

(58) Field of Classification Search ........... 705/26.1, 705/26.41, 26.44, 26.7, 27.1; 707/706, 728, 707/732, 733
See application file for complete search history.

(56) References Cited

U.S. PATENT DOCUMENTS

| | | | | |
|---|---|---|---|---|
| 6,169,986 | B1* | 1/2001 | Bowman et al. | 1/1 |
| 7,212,990 | B1* | 5/2007 | Greden et al. | 705/26.7 |
| 7,305,355 | B2* | 12/2007 | Tarvydas et al. | 705/26.43 |
| 7,904,369 | B1* | 3/2011 | Andreasen et al. | 705/37 |
| 7,912,852 | B1* | 3/2011 | McElroy | 707/769 |
| 2003/0126095 | A1* | 7/2003 | Allen | 705/80 |
| 2003/0163302 | A1* | 8/2003 | Yin | 704/9 |
| 2005/0097003 | A1* | 5/2005 | Linker | 705/26 |
| 2006/0195428 | A1* | 8/2006 | Peckover | 707/3 |
| 2007/0239671 | A1* | 10/2007 | Whitman et al. | 707/2 |
| 2007/0288327 | A1* | 12/2007 | Pulnikova | 705/26 |
| 2008/0004992 | A1* | 1/2008 | King et al. | 705/27 |
| 2009/0271293 | A1* | 10/2009 | Parkhurst et al. | 705/27 |
| 2009/0287683 | A1* | 11/2009 | Bennett | 707/5 |
| 2011/0307814 | A1* | 12/2011 | Audet | 715/764 |

OTHER PUBLICATIONS

Horwitt, E., "In Search of: Good Searching," Computerworld, Apr. 28, 1997, p. 16.*
Anon., "Online Shopping Just Became Easier; Brodia Launches Online Shopping Service Free for Consumers," PR Newswire, Nov. 15, 1999.*
Anon., "Frictionless Commerce and CyberSystem Technologies Team up to Deliver End-to-End Purchasing Solution to the General Services Administration's Buyers.Gov Site," Business Wire, Aug. 2, 2000.*
Anon., "Clickthebutton and Active Buyer's Guide Team up to Offer Powerful Comparison Shopping Service," Business Wire, Aug. 3, 2000.*
Anon., "TiVA: Bradford & Bingley Signs up for Unique Supplier Management Solution," M2 Presswire, Apr. 6, 2005.*

(Continued)

*Primary Examiner* — Nicholas D Rosen
(74) *Attorney, Agent, or Firm* — Wells St. John PS

(57) ABSTRACT

Aspects of this invention disclose a system for providing a purchaser specified product search engine, including providing storage circuitry comprising a database of products, storing product data in the database, receiving from a prospective product purchaser, product data of a desired product to purchase, accessing the database of products and comparing the product data to product data in the database, and determining a probability that the product data matches product data stored in the database. Other aspects may include a data processing apparatus providing a purchaser specified product search engine, including storage circuitry comprising a database of product data, processing circuitry configured to receive purchaser specified product search inquiry data, accessing the database of product data, and comparing the purchaser specified product search inquiry data to the product data; and determining a probability that the prospective purchaser product data matches the product data stored in the database.

12 Claims, 8 Drawing Sheets

OTHER PUBLICATIONS

Anon., "New Day for Online Shoppers: Fatlens Launches First-Ever Search Engine Built Expressly for Online Shopping Company to Expand Successful Event Ticket Search and Preview Six Additional Shopping Categories at DEMOfall," PR Newswire, Sep. 19, 2005.*

* cited by examiner

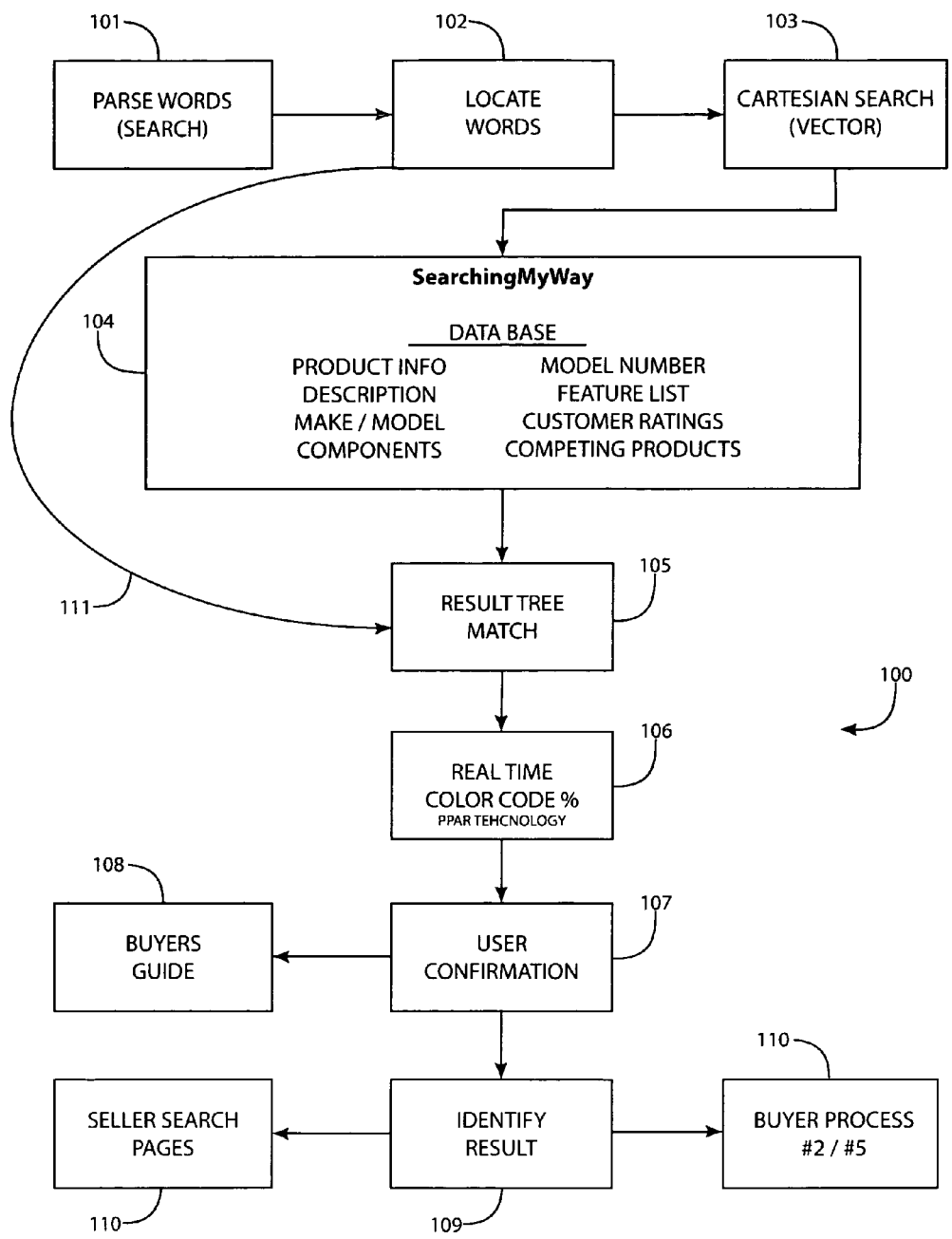

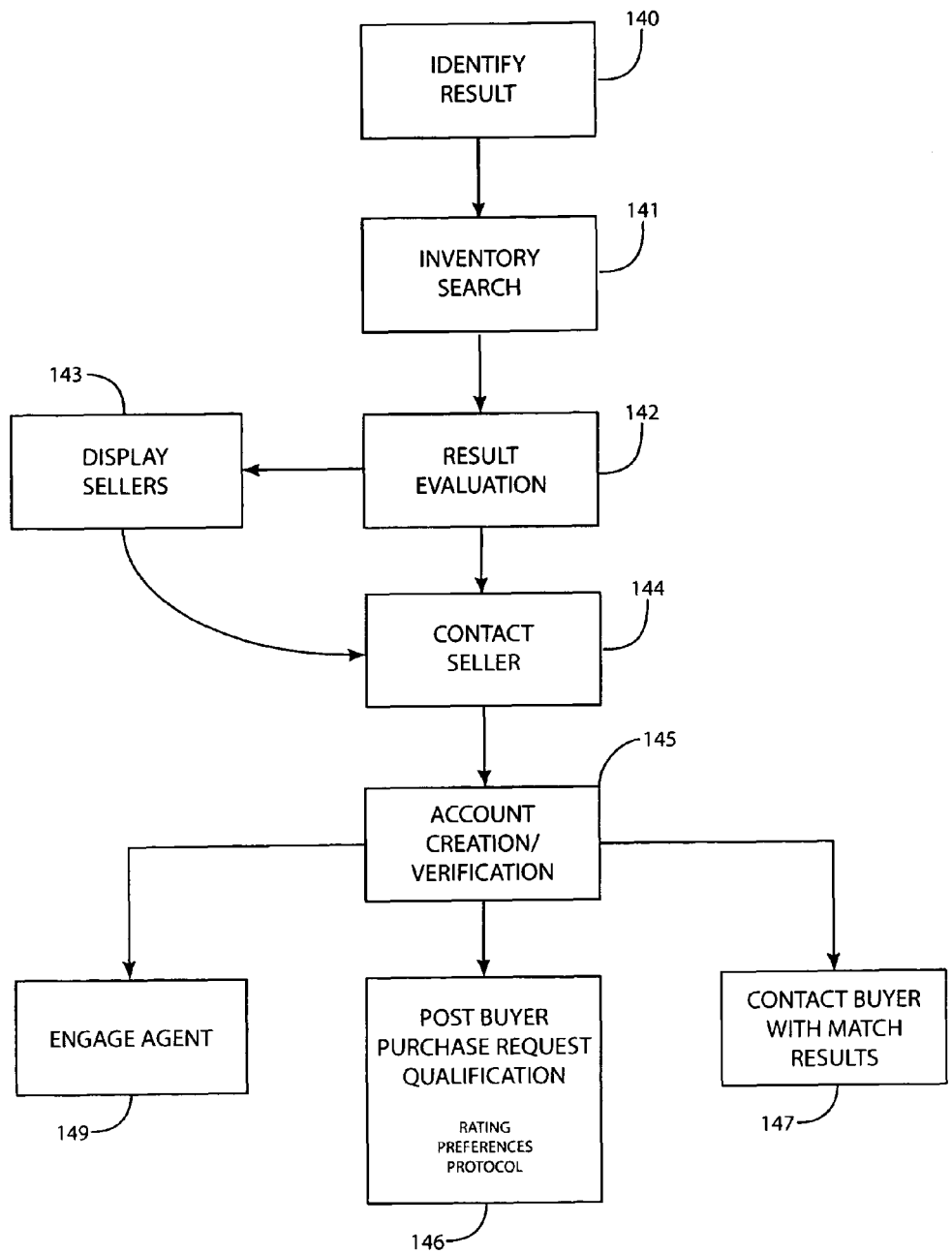

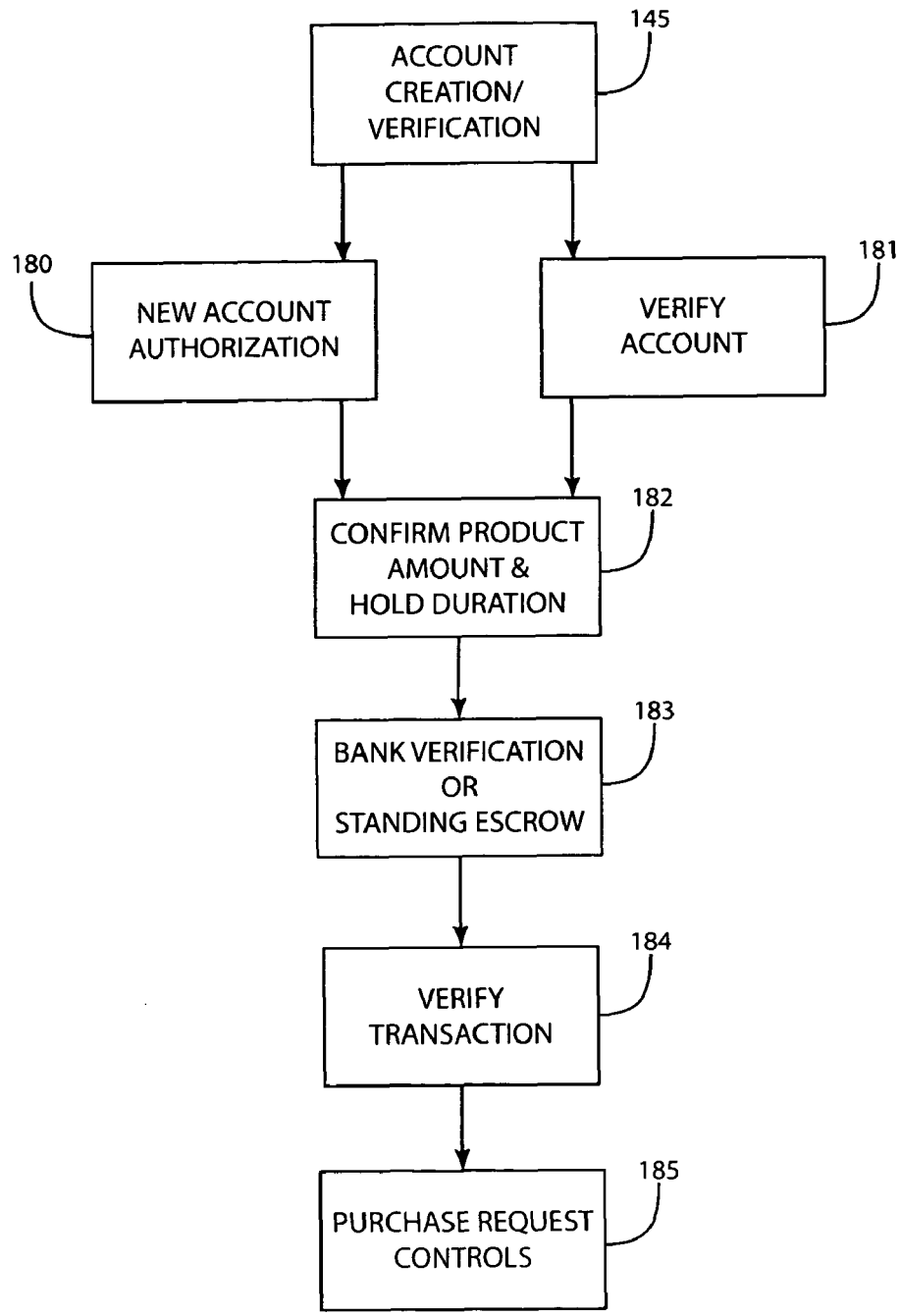

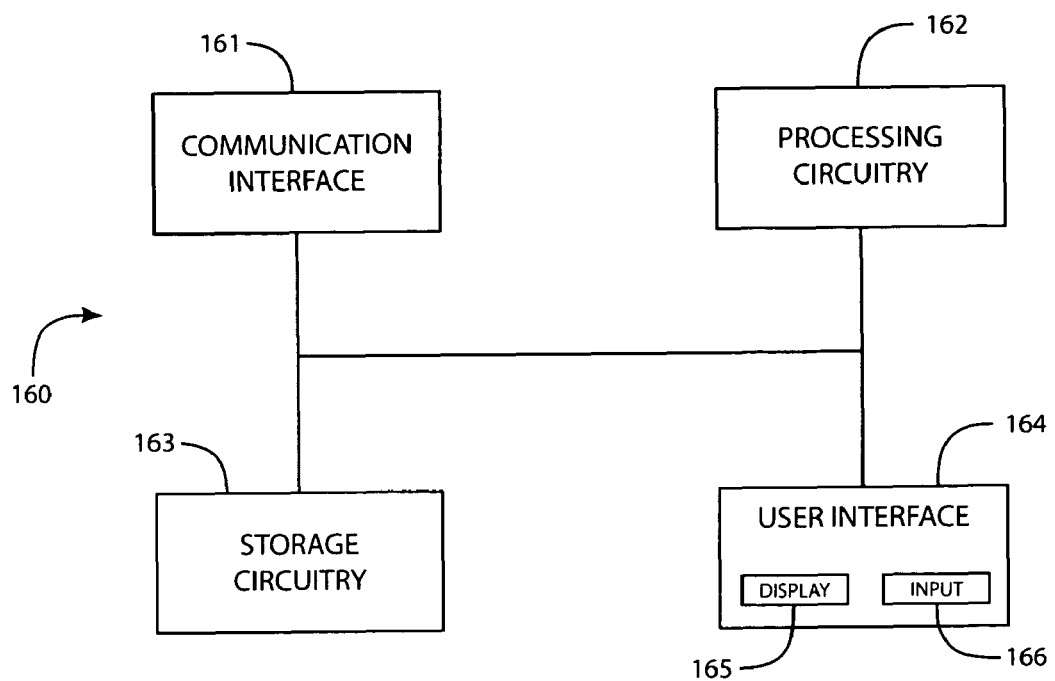

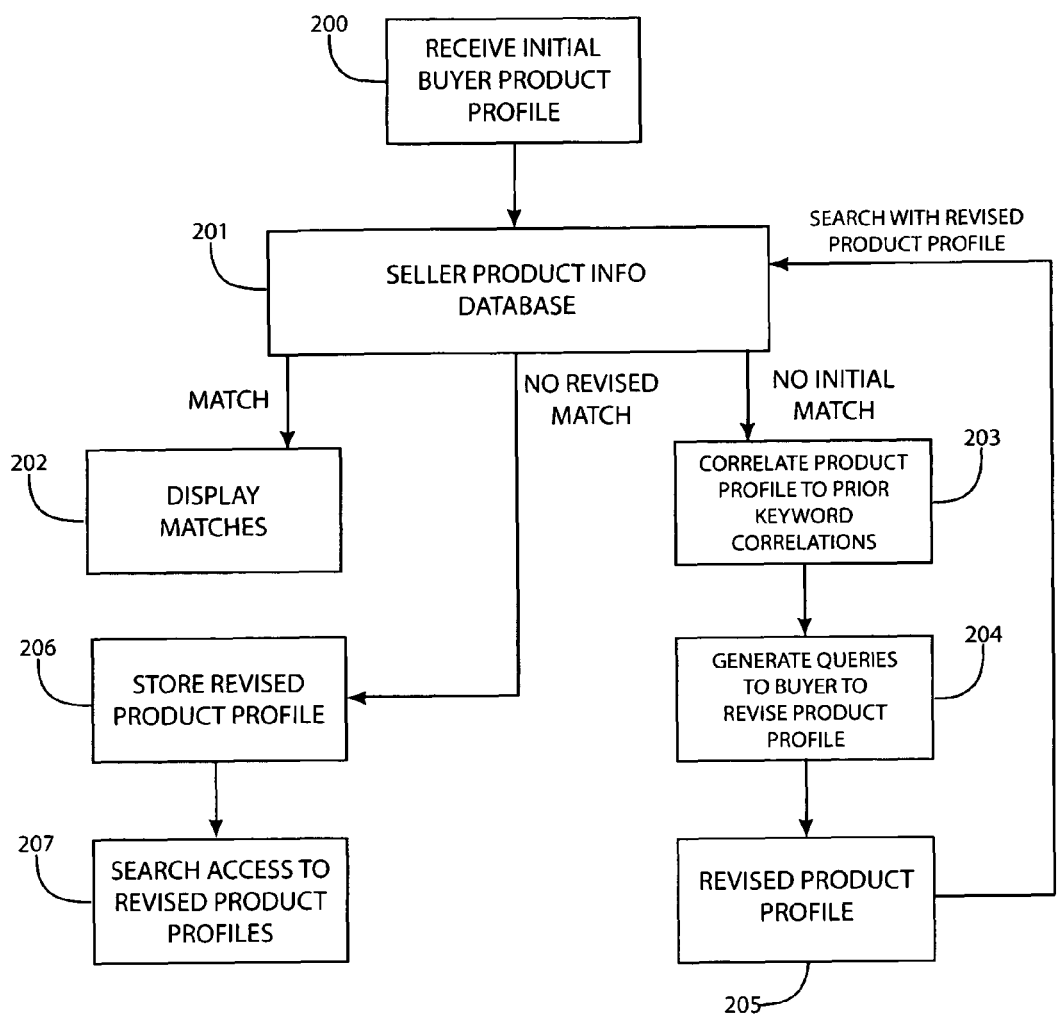

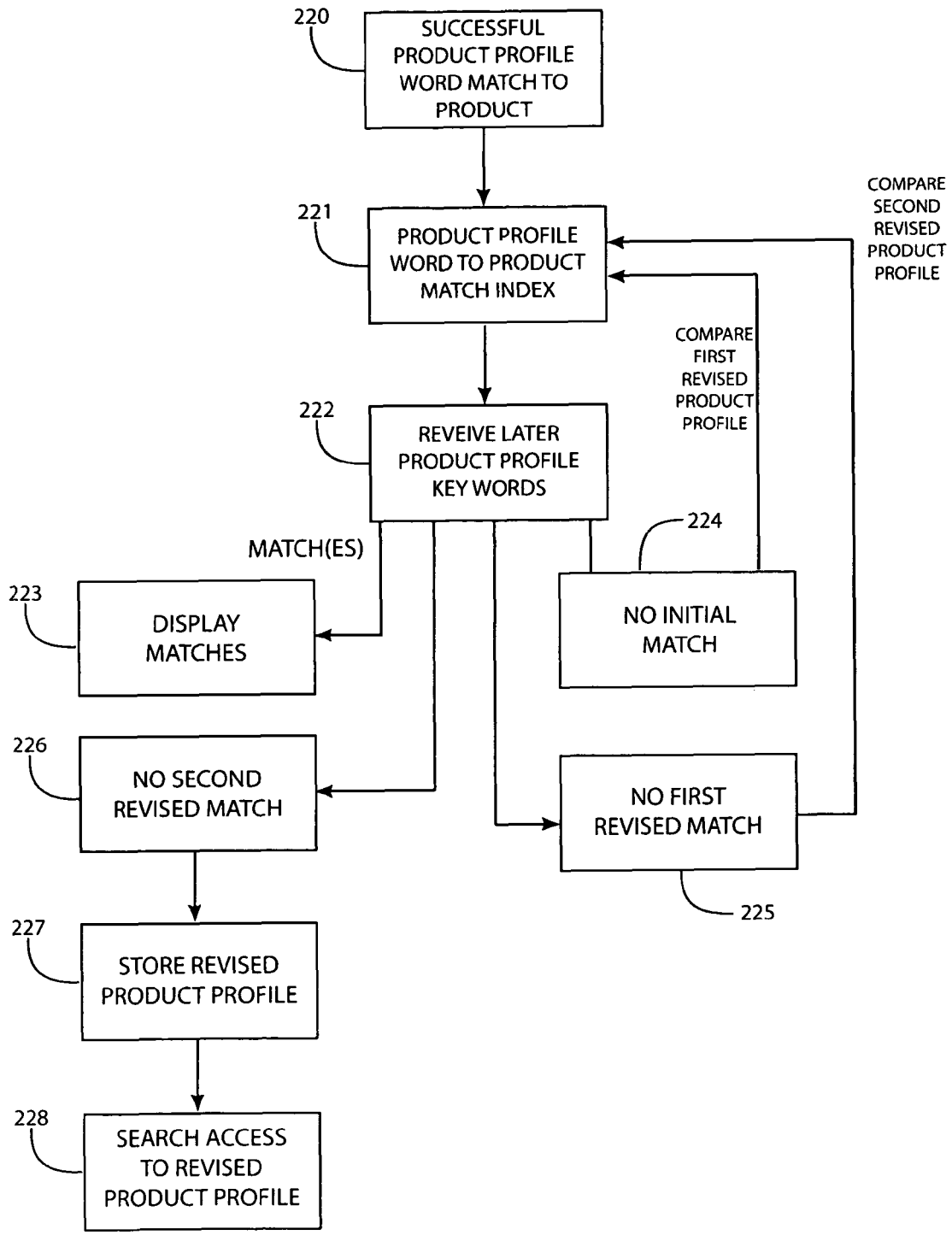

PURCHASER CENTERED, PRODUCT DRIVEN WORLD WIDE WEB SEARCHING AND E-COMMERCE SYSTEM

CROSS REFERENCE TO RELATED APPLICATION

This application does not claim priority to any prior applications.

TECHNICAL FIELD

This invention generally relates to a purchaser centered e-commerce system wherein a purchaser inputs his or her desired product specification, which is then utilized to only direct the prospective purchaser to products (and only products) meeting that description, and/or in the absence of an immediate hit or match, maintaining the product specifications available for a pre-determined period of time for prospective sellers to search in an effort to attempt to fulfill the requirements with a product.

BACKGROUND OF THE INVENTION

The World Wide Web has developed into a significant transactional venue, sometimes referred to as e-commerce. As the online marketplace has developed, many retailers and individuals with one or more products to sell make detailed product information available online through their websites and other postings. However in order for prospective purchasers to then locate the product(s) they desire, they are currently limited to traditional searching. For example in traditional prior art type searching, prospective purchasers may conduct key word type word searches through generally known search engines which store product inventory information, and this will often times provide the prospective purchaser a long listing of websites or web pages which have been rated to contain the key words sought for. The search results list may contain any one of a number of different types of references, such as word references wherein the key words appear in an article, some product references, and any one of a number of other references. Existing searching and systems can therefore be inaccurate and/or provide a substantial amount of additional and unwanted information that the buyer then must screen through. This can take and waste a significant amount of additional time and consumers will demand more and more tailored search capabilities.

Too often the current inquiry and keyword match searching system for e-commerce requires reviewing dozens or hundreds of websites and references, and screening those venues to try to find the specific product the purchaser wants. This takes substantial time and results in fewer transactions than if a system were developed wherein a retailer or individual with one or more products to sell can utilize this invention to locate a buyer for their product(s). The purchase inputs the desired product information, and that information is then utilized to match a product available for purchase; or in the absence of a product match, to provide sufficient information so that a qualified seller can learn of and then provide a product matching the specific product criteria input by the prospective purchaser.

An object of some aspects of this invention therefore is to provide a purchaser based product system which provides the prospective purchaser only the product(s) or types of product(s) being sought.

Another object of aspects of this invention is also to provide a learning system which works with the purchaser input to provide assistance, learning and verifications to make the purchaser more efficient in the searching.

Yet another object of aspects of this invention is to provide such a system which retains prospective purchaser product specifications for a pre-determined length of time in a manner optimized for prospective vendors to locate individuals motivated to purchase products that meet those specifications. This allows purchase requests to be entered once by the potential buyer even when matching products are not currently offered for sale. The vendor(s) can repeatedly search purchase requests in an optimized manner in their attempt to satisfy these purchase requests.

While the invention was motivated in addressing some objectives, it is in no way so limited. The invention is only limited by the accompanying claims as literally worded, without interpretative or other limiting reference to the specification, and in accordance with the doctrine of equivalents. Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 2 is a flowchart illustrating one embodiment of the invention;

FIG. 3 is a flowchart illustrating an aspect of one embodiment of the invention once the product search result is identified;

FIG. 4 is a flowchart illustrating one embodiment of another aspect of the invention wherein the prospective purchaser can post the product specifications for potential sellers to search and attempt to fulfill;

FIG. 5 is a block diagram of an exemplary data processing apparatus a flowchart which may be utilized in some embodiments of this invention;

FIG. 6 is a flowchart illustrating another example of an embodiment of this invention;

FIG. 7 is a flowchart furthering the embodiment illustrated in FIG. 6.

DETAILED DESCRIPTION OF THE PREFERRED EMBODIMENTS

The term "data" as used herein may be any individual or group of data, data points or items, from any one of a number of sources and may be any one of a number of different types of data. Data for example may be a sensed data or grouping of individual data points or inputs. Some examples of data may include information, parameters, characteristics, data points, groups of data points or characteristics, inputs, signals, etc. It will also be appreciated by those of ordinary skill in the art that data may also be a grouping or combination of any of the foregoing.

When the term "accessing" is used in connection with accessing data, accessing characteristics or accessing other items, it is not limited to accessing data or information from outside the processor, but instead would include all such items accessed within the data processing apparatus or system, or external to the data processing apparatus.

When the term "access device" is used herein it refers but is not limited to a computer, mobile device, data processing apparatus, and any and all other access points or nodes from which the World Wide Web, internet, intranet, database or other medium or platform on which the data to be accessed is located or stored.

Embodiments of this invention are methods and apparatus configured to receive, which may in some examples mean a system is configured to receive, collect, capture, or parse data (such as from a database, storage circuitry, over the World Wide Web or the internet), and then to process or utilize said data as further described herein.

Figure 1:
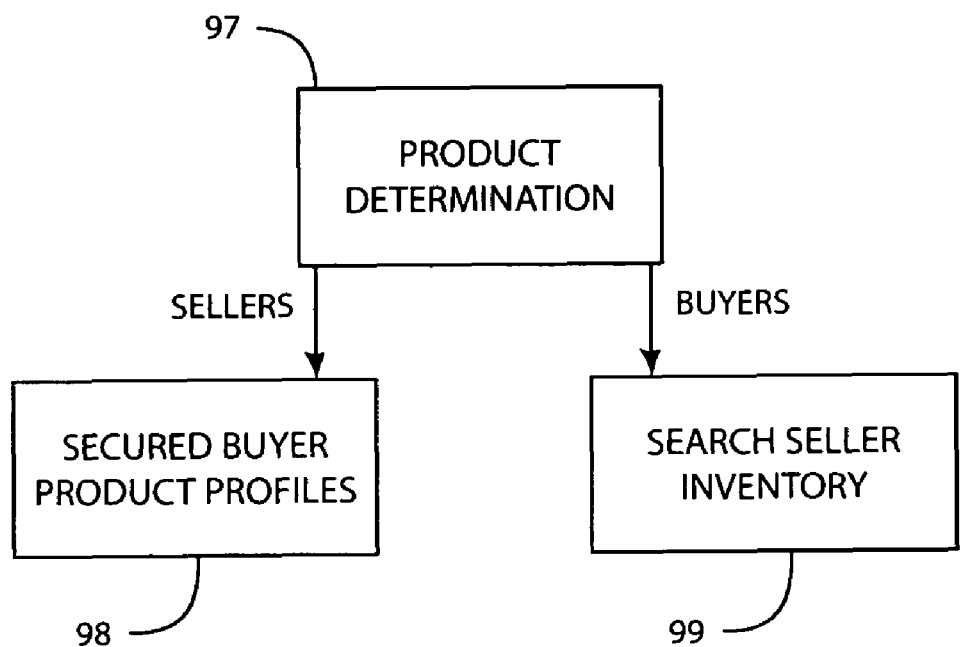
FIG. 1 is a flowchart illustrating an overview of one embodiment of the invention.

FIG. 1 illustrates a flowchart of one embodiment of an overview of the invention, illustrating how the invention focuses on first identifying the product, i.e. the product determination step 97. Thereafter if the user is a buyer, the user proceeds to step 99 wherein the user/buyer accesses storage media, processing circuitry, hardware storage media or hardware processing circuitry which includes data including available seller inventory. Whereas the user is a seller on the other hand, the seller/user proceeds to step 98 wherein the seller/user accesses storage media, processing circuitry, hardware storage media or hardware processing circuitry which includes data regarding possible buyer/user product profiles and the accessing allows the seller user to access the buyer/user product profiles to determine if the seller may have a product matching said buyer product profile.

FIG. 2 is a flowchart illustrating one embodiment of the invention, a purchaser based system 100 wherein a purchaser or seller may specify product information and the resulting search, search results and product identification, are all based on what the purchaser or seller wants to identify; and in the preferred embodiment, only contains product based search results.

At step 101, a prospective purchaser or seller enters words or keywords to begin specifying the intended or desired product. The words are parsed and analyzed with the goal of finding a product match. In step 102, the result tree database is being searched to locate a match to search terms entered previously by users of the system. If results are found real time color code percentage 106 can be displayed to the user. The locate words step 102 may be accomplished in multiple different ways. For example in some aspects or embodiments of this invention a quick result or quick hit may result in a product identification early in the process. If the words describing or specifying the product do not result in an early product identification, then the purchaser specified terms will be utilized to learn more about the desired or specified product.

A failure to locate any matches in the result tree database at step 102 may lead the system to step 103. At step 103 for example, a Cartesian type of search may be utilized to evaluate the word or combination of words relative to products, including product data or information which has been entered in database 104. For example if two input data are specified and they are related to a particular product, then that strengthens the correlation of one of the input data. For example if Ford and hubcap are both specified by the prospective purchaser, the use of the term hubcap in that specification strengthens the idea that Ford is the manufacturer or that it is associated with a Ford vehicle.

This further evidences that a learning system may be part of some aspects or embodiments of this invention and it also illustrates how the system or method may transform any query into an identifiable string similar to a uniform product code string of information or data. This type of system allows a prospective purchaser to ask or inquire as to more specifically query what the prospective purchaser wants. If the prospective purchaser selected terms for example are not readily recognized or consistent with what is already in the database, then the system may present the prospective purchaser with follow-up questions. If the product specifications entered by the prospective purchaser are consistent with values in the database for such products, then a successful search results and the sought products are identified and presented for review by the prospective purchaser, including as described below, a photograph of the product for visual confirmation.

As successful and unsuccessful correlations are made between the words and phrases used by prospective purchasers, correlations will develop between those specified words and specific products, thereby developing a correlated learning database. The prior use of terms or phrases in successful searches may then be utilized in later searches to associate the product identification with the same or similar words and phrases to help a new prospective purchaser or to further validate that a proper product match has been made with a new prospective purchaser's query. The system therefore builds a real-time correlation between the words and phrases used in a successful search and products sought. In the example given above using Ford and hubcaps, if several people type in Ford hubcaps, they will all end the process in a successful search identifying Ford as the manufacture and hubcaps being the coverings over wheels, then a statistical correlation is established between the phrase Ford hubcaps and this search result.

Aspects or embodiments of this invention may also provide a prospective purchaser specific key words which may then be selected so that the product search may be better specified for use in the database. Experienced prospective purchasers or more sophisticated prospective purchasers that use the system more may be trained so their initial word or phrase input can help the initial search if they do use certain keywords. For instance if they learn input behavior that specifies the make and model of a potential product, such as Ford and automobiles, the system will immediately know what the inquiry is seeking and be better able to pinpoint or refine the search potentially down to one or just a few exact matches. This thereby enables the experienced prospective purchaser to bypass the process of refining their search or inquiry.

In the event a purchaser does not enter keywords or phrases that are highly correlated to the desired product, tutorials or other additional information may be made available to the prospective purchaser through such mechanisms as pop-up windows, which may then assist the prospective purchaser in further defining or refining the search inquiry. This may be used to provide feedback to help and guide them to refine the search so the next time they visit the site they will have been better prepared to have a more exact search based on their inquiry. The system therefore helps train prospective purchasers and develop their behavior to make the process more efficient. The tutorial for information may be as simple as inserting text that informs the prospective purchaser of the potential words or phrases that can be utilized to direct the next inquiry to the specific product in the identify results step 109. This would be particularly helpful for prospective purchasers who are conducting searches for the same or similar types of products repetitiously.

The database 104 provides the data or information and matrix for accessing the information for the product specifications and identifications, and may be literally or practically any one of a number of different types of databases, which are well known by those of ordinary skill in the art. The database 104 may be any one of a number of different types of databases, circuitry or other structure which facilitates the entry of data or categorized data, which can be searched and compared. The database 104 may also in aspects of this invention provide for the learning portion of the system to categorize and correlate successful search knowledge or threads.

Embodiments of this system differ from past systems in that in the traditional search engines, a user is selecting potential websites which may or may not include products; whereas in this system the prospective purchaser is selecting the actual products that the system has determined that prospective purchasers looking for. This exemplary database is an aspect of the invention, the database possibly including such structured information as product statistics, product information, product data, product descriptions, make, model, including components of the product, model numbers of instances of the product, a list of marketed features, customer ratings, competing product identifiers, related purchase requests of this product, and vendor inventory of this product, to name just a few.

So as each word or phrase is entered and evaluated, there are typically two processings occurring, namely the learning or attempting to correlate and learn from successful and unsuccessful matchings or correlations (step 103); and concurrently the search attempting to get an immediate result (step 102). Both of these processes may inquire back to the prospective purchaser or seller if statistical results are too small to derive a conclusion.

Step 105, the result tree match, may be the conclusion of step 103 or may be a direct conclusion of step 102. If step 102 cannot find matches in the result tree database, it may signal the simultaneous step 103 to produce result tree entries for step 102 to successfully match. The seller or buyer may still be queried as to what they meant to search for or to verify if what they specified was in fact what the system has identified.

The database 104 may also include a listing of sellers and potential sellers who may also store inventory with product description and specifications therein. The merchants may be scored based upon successful transactions and their score and ratings may also be stored and accessible in the database in some aspects or embodiments of this invention.

The system is designed to store all of the information, inquiries and successful searches received from perspective purchasers. This information can then be used in different ways, analyze and reanalyze to produce search results information and correlations. The analysis engine will be a process which may run in the background which frequently and continuously may produce and refine search results. As the analysis engine or result tree receives new inquiries and success information, it is continuously updated and each update may alter or confirm the existing result tree. The goal of statistically identifying a single product can be graphically displayed to the user with a count of probably matches and a corresponding color indicator. As the search words are entered by the seller or buyer and a single match grows more statistically probably, the display of counts and color can change in response.

It should be noted that when a result tree and product database are provided, the display the prospective purchaser sees is related to the number of potential product matches found in the product database and not to the number of sellers or inventory matches as existing search engines do. The initial object at this step is to come to consensus or agreement on what the prospective purchaser is looking for and not necessarily where the product might be purchased. The goal of this result tree inquiry is to identify one product and therefore the real-time response would show the highest success percentage when the prospective purchaser has entered an inquiry that uniquely identifies a single product.

Arrow 111 indicates that based on the words chosen or input, the user may skip over step 104 and go directly to the result tree match 105 step. This would more likely be an experienced user.

Again, this would only be identifying specific potential products. Step 106 is labeled the real time color code percentage wherein the prospective purchaser is provided a hierarchy of products which the system believes have been specified based upon a percentage matching figure. These results may be color-coded to help the prospective purchaser identify which of the matches that the system has identified as the highest and whether that is the correct one. It is at this step where prospective purchaser feedback, verification or input is sought. It would be analogous to a traditional search engine result yielding a list of potential matches which are presented to the prospective purchase, who must then select a potential website which may or may not have the desired or specified product, and then the prospective purchaser must search that website to try to find the product if it is there.

Again this would only be identifying specific potential products and not information, words are other things that might be on a website that you would select. This provides the prospective purchaser with assurance that it's solely searching for identifiable products and not merely words that may be products, information or other terms which happened to be used on a website, thereby eliminating the need for the prospective purchaser to screen through voluminous material to finally come to the desired product.

Step 106 may also be referred to as Pin Point Accuracy Return ("PPAR"), which refers to the fact that this system only provides the information the prospective purchaser input and not a large mass of other information that must be screened by the prospective purchaser, which wastes time and may alter a prospective purchaser's attitude toward making a purchase.

It will also be appreciated by those of ordinary skill in the art that this system may additionally include a more typical seller search system wherein a prospective purchaser has the ability to browse the inventory of products and engage in commerce using a traditional shopping cart with traditional transaction delivery management. However, if the desired product is not available in inventory or is in inventory but not at the prospective purchaser's desired price, the prospective purchaser may also post a request for the product so that sellers may search the request and if they have the specified product, contact or message the prospective purchaser. This may constitute a request to purchase and would be made available for all to review and consider and would also place more of the burden on the seller to work to find the purchaser of products it may possess rather than requiring the buyer to search for the right seller, product and price for example. If a request to purchase is posted, the prospective purchaser will be able to configure a number of settings to control or specify how sellers can interact with them and which sellers. These configuration settings may also include the duration that the post will be available, post refinement permissions, seller ratings, match percent requirement, mutable responses, contact options and purchase commitment levels, to name a few.

It may also be during this process that the prospective purchaser incorrectly posts product specifications and the system will allow specifically approved vendors to refine the posts or to make additional inquiries or interact with the prospective purchaser to more correctly specify the desired product.

At step 107, entitled user confirmation, the prospective purchaser or user will be asked to verify if the system has properly interpreted the request, or for the prospective purchaser to identify which of the potential specified products the prospective purchaser intended to select, i.e. which prospective selection is correct. This stage of user feedback will help further hone in on the correct product sought.

During this step, aspects or embodiments of this invention may include feedback information and accuracy of feedback information. For example, the invention may display query accuracy information through color, numeric and icon displays of the number of potential matches, with a lower number of matches being more favorable since it likely means that the product is closer to being identified. This is distinguished from typical search engines today which require a user to post their inquiry in order to view the responses. During this trial and error procedure and often results in the considerable number of trials. While the search engines have begun to show a list of potential matches while the user is typing in the inquiry, the matches do not normally include any accuracy feedback information.

The buyer's guide step 108 is provided when the system has not yet determined what product the prospective purchaser is specifying. For example the prospective purchaser may have entered "DVD player", which may result in 200 different models being identified at this stage, and the prospective purchaser would then be given the option of confirming that is what the prospective purchaser was specifying. The prospective purchaser may then be provided an option to allow the prospective purchaser to make a choice by reviewing different information or data about specific DVD players. There may be expert information or systems incorporated in the process wherein the prospective purchaser can receive information about the most popular DVD players, or the DVD players that have the most user complaints, or are the most reliable. The buyers guide can include a wide range of different types of information that buyers of products might consider relevant or useful in further identifying the specified product that the prospective purchaser wants to acquire.

Step 109 is labeled "identify result" and is a step wherein the prospective purchaser receives feedback from the system. For example the system may provide the prospective purchaser a photograph of the product the system believes was specified, or other product specifications or details. This result may even include transactional details such as potential shipping costs. It will be appreciated by those of ordinary skill in the art that the wide range of additional and other information may be provided back to the prospective purchaser at this point, such as current retail pricing, inquiring as to what price the prospective purchaser would like to buy the product for, as well as others. This step also thereby provides the prospective purchaser with a visual confirmation that the correct product or products have been identified and they can confirm from a photographic example that is the product that they do want to purchase.

Once the search result is identified or confirmed, the prospective purchaser may have a couple of different options or selections, such as step 110 labeled as "seller search pages", which may be utilized to give sellers access to data or information derived from the database. This step 110 may include seller entered product information and specifications, so that potential sellers may provide exact information about what they have or what they are willing to do in a transaction. It is noteworthy at this stage that the product has already been identified and once that is accomplished, the system can address the different wants and needs of the seller and buyer. This may include for example the prospective purchaser stating a price that is desired for the purchase, or other terms, such as the seller must be qualified with a certain minimum ratings.

FIG. 3 includes a flowchart which provides a more in-depth description of the identify result step 109 from FIG. 2. Once the results for the prospective purchaser are identified, other transactional options may be utilized. For example the system may then search the inventory of prospective sellers to identify what sellers have qualifying products on the site and then provide the prospective purchaser with the results of that search. The prospective purchaser can then choose to only display products from one or more specified sellers or can specify other requirements in order to move forward with the transaction. This entire system can be tailored towards the prospective purchaser, the purchaser's needs and requirements and the purchaser's preferences. Once the results for the prospective purchaser are identified, the purchaser may also for example be shown a photograph or image of the product for visual identification or verification.

FIG. 3 provides an alternative when specific products which are qualified to the prospective purchasers requirements are not immediately available, and allow the prospective purchaser to post information, qualifications and criteria related to the product and the potential purchase transaction. A prospective purchaser can make any one of a number of different requirements on the transaction, prospective seller requirements and product specifications, which may include without limitation, seller rating, preferences, protocol, satisfaction ratings, and the like. The prospective purchaser can also specify whether a 100% match is required or if an 80% or less match may be acceptable to the prospective purchaser, in fulfilling the prospective purchaser's post.

As a result of the innovative use of purchase requests as a structured and search-able database of information, product correlations can be established between purchase request database entries and existing inventory products. These correlations can then be utilized to contact sellers that might have unlisted inventory which matches the purchase request description. As an obvious example, if someone enters 1955 Ford F100 hubcaps as a purchase request and the system holds a correlation between a 1955 Ford F100 and 1955 Ford F100 hubcaps, any vendor with a 1955 Ford F100 for sale might be contacted and informed of the hubcaps purchase request.

In FIG. 3, step 141 reflects a more traditional search engine process wherein processing or storage circuitry including seller inventory input by seller is searched and compared to the purchaser product profile to determine if there is a match based upon the comparing. At step 142 the results of the inventory search are evaluated. If for example there are a large number of matches, the results can be further evaluated or rated based on a criteria chosen by the system or by the user, such as for example but not limited to: by price, distance from buyer. At step 142 the buyer may be given the option to for example pay a fee to contact the seller at step 144, or to display a list of sellers at step 143 for potential contact. At this step 143, the sellers and/or seller contact information is displayed and the buyer is given the chance at step 151 to contact the seller, for which a fee may be imposed.

It is once the option is selected to contact the seller at step 144 or to have the seller contact the purchaser that the user's account may then be created or verified to then enable the transaction to proceed and for a billing event to occur. There may be no fee for a buyer to post the product profile information but there would more likely be a fee once the contact is made, i.e. the fee being preferably tied to the transaction of the contact for the sale. If the processing of step 142 determines no seller inventory for the identified product exists within the system, the system advances to step 145 to allow that a seller be found for the requested product. The results in a lasting ability to find a seller compared with the typical real time ability as in existing systems. This step may require the buyer to create an account with the system to allow the system to contact the buyer at a later time with results of its efforts toward finding a seller. Furthermore, the account identified by step 145 will contain settings, preference's, and options specifically designed to improve the accuracy of matching the appropriate seller to the buyer. Steps 146, 147 and 149 identify the three basic options for locating a seller.

Once the account has been created or verified in step 145, in a preferred embodiment three basic options may be presented. A first option identified as item 149 may be for the buyer who chose to have the product profile information posted, and that buyer may engage an agent \such as a software agent, to further search for a product match (such as by searching websites and databases external to this system). While this invention is not limited to any particular type of agency in this step, it may include allowing the buyer product purchase profile to be posted on other websites or ecommerce sites to attempt to find the match—i.e. to go beyond this system. An advantage of some embodiments of this invention is the ability or option to interact with and utilize other sites to attempt to match the product profile input by a prospective buyer to further leverage the chances of a match.

A second option after the account had been created or verified in step 145, may be to post the buyer purchase request on the site. The system may be specifically designed to efficiently and accurately initiate transactions between buyers and sellers based on the purchase request profiles entered by the buyer. In aspects of a preferred embodiment of this system provides a database of purchase requests specifically engineered to enable sellers to locate a buyer—whereas an existing system that merely provide a seller inventory and product database specifically designed to enable buyers to locate a seller. This system facilitates product sellers exercising innovation to locate a buyer motivated to purchase products the seller may not be advertising. This difference from the prior art will provide the buyers a significant efficiency gain and advantage over current systems in their attempt to locate a specific or unique product.

The effort of posting buyer requests for sellers to locate is similar to the process of a reverse auction. The intent of a reverse auction is to reduce the price of goods by establishing competition between sellers. While the system may accomplish this outcome, aspects of the preferred embodiment of this invention address additional goals; the primary goal being the location or identification of sellers for unique, specific and hard to locate goods. Buyers often desire replacement parts, off market goods, custom solutions, or innovative services. This system addresses the location of hard to purchase goods in a unique and effective manner. The identification of emerging markets is another objective of this invention and by recording and posting purchase requests separate and independent from existing products or inventory, a surge in interest for a limited or non-existent product can be identified. This in turn will help to drive production or supply of these products. These two objectives, locating the hard to find products and identifying emerging market demand, are two examples of how the preferred embodiment of this invention differs from a reverse auction.

The third option for locating a product for the buyer is identified in step 147. In this step, potential sellers are contacted by the system. Step 146 provides a specially designed database of buyer information to assist sellers, but still requires buyers to come to the site and search for buyer entries. This step contacts the seller based on the correlations found in the database of product information. Once contacted, the sellers can utilize the search capacity established by the buyer database. The product database holds correlation information between products. This correlation information is used to determine what sellers to contact. For example, if a buyer is interested in 1947 Ford hubcaps and no inventory exists with the product, the system can establish a post for this purchase request. Step 149 will search other databases for this inventory. Step 146 will post this purchase request for sellers to search. This step will utilize the product database and determine that 1947 Ford hubcaps are a component of 1947 Ford cars and trucks. It will then attempt to locate sellers of 1947 Ford cars and trucks to inform them of a potential buyer for hubcaps.

Once a transaction is completed via any of the options in this system, the system may provide the buyer and/or the seller with the option to complete a purchase satisfaction rating for the other party in the transaction.

FIG. 4 is a flowchart for new accounts and provides a faster way to allow the prospective purchaser to more easily qualify the prospective sellers and for the prospective sellers participating to receive only well-qualified buyers and not mere shoppers. This system and invention may provide in some embodiments ways to differentiate shoppers and unqualified sellers. In one aspect a buyer commitment level may be included wherein an able purchaser who may want to pay $100 for a product would commit or escrow $10 to the process to convince prospective sellers that prospective purchaser is committed to purchase. This might be like an earnest money in a real estate transaction that the prospective purchaser would lose if they receive the exact product they were looking for and did not close the transaction. This may be done through intermediary such as a bank or other payment intermediary available. In the alternative to an escrow, bank account balances may be shown, bank credit card holds on funds similar to those used to hold payment on hotel rooms, PayPal or other third-party escrow services may also be utilized.

FIG. 4 starts with the account creation or verification step 145 and provides expanded options at that stage in the system. If the user is a new user, step 180 provides the new authorization and once that is provided, the user proceeds to step 182 where the product amount, price and hold duration may be confirmed. In the event the user is an existing user at step 145, that user would proceed to step 181 to verify the account.

It is at step 182 that a searchable product profile and a determination how long the seller may hold the product to close the transaction. There may then be a bank verification or escrow at step 183 and the transaction is verified at step 184. Step 185 may provide purchase request controls or preferences such as only proceed with three star and higher sellers, or sellers within a 100 mile radius, or whatever other desired control or preference a buyer may desire or instruct.

FIG. 5 is a block diagram of an exemplary data processing apparatus 160. FIG. 5 illustrates that communications interface 161 is arranged to implement communications of computing device 160 with respect to external devices not shown. For example, communications interface 161 may be arranged to communicate information bi-directionally with respect to computing device 160. Communications interface 141 may be implemented as a network interface card (NIC), serial or parallel connection, USB port, FireWire interface, flash memory interface, floppy disc drive, or any other suitable arrangement for communicating with respect to computing device 160.

In one embodiment, processing circuitry is arranged to process data, control data access and storage, issue commands, and control other desired operations. Processing circuitry 162 may comprise circuitry configured to implement desired programming provided by appropriate media in at least one embodiment. For example, the processing circuitry 162 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 163 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi conductor media. Some more specific examples of processor-usable media include, but are not limited to a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 163 described above and/or communicated via a network or other transmission media and configured to control appropriate processing circuitry 162. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 161, or provided using other appropriate communication structure or medium. Exemplary programming including processor-usable code may be communicated as a data signal embodied in a carrier wave in but one example.

User interface 164 is configured to interact with a user including conveying data to a user (e.g., displaying data for observation by the user, audibly communicating data to a user, etc.) as well as receiving input from the user (e.g., tactile input, voice instruction, etc.). Any other suitable apparatus for interacting with a user may also be utilized, including three-dimensional interfaces which instead of merely being on an X-Y plane may include three dimensions, namely X, Y and Z.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance, if a flowchart as described below expressly or implicitly requires for example that a processor or storage be utilized, the applicable components described herein with respect to FIG. 5 may be so utilized even if not specifically recited for that step.

It will be appreciated by those of ordinary skill in the art that this invention allows the pre-processing of the product information to allow the pinpoint identification of a seller and a limited time for entering the transaction. This will reduce the time and searching significantly. An additional benefit of this invention is that if a product is not readily available or identified in the database, a posting may be made which will hopefully result in numerous sellers and potential sellers looking for that product to sell to a prospective purchaser even after the prospective purchaser is off-line.

When the phrase successful product match is used, it is not limited to an identical match between the initial or any later revised purchase product specification data and the plurality of product specification profiles in the seller product information database, but instead may be a close match and the accuracy may be set depending on the desires of the purchaser or based on some other criteria determined by the operator or administrator of the system.

FIG. 6 is a flowchart illustrating another example of an embodiment of this invention. In FIG. 6 at step 200 an initial buyer product profile is input or received. A seller product information database of product profiles 201 is accessed and a comparing is made of the initial purchase input product profile to the plurality of product specification profiles in the seller product information database. The seller product information database may include a plurality of product specification profiles and/or world wide web derived product specification profiles. The system then determines if there is one or more product matches between the initial purchaser input product profile and at least one of the plurality of product specification profiles in the seller product information database.

If there are one or more successful product matches of the initial purchase input product profile to at least one of the plurality of product specification profiles in the seller product information database, the operation goes to step 202 and the matches may be displayed, the matches being the one or more successful product matches. If there are no matches from the first comparing, further inquiries are submitted to develop a first revised purchaser input product profile. In this step the initial purchaser input product profile is correlated to prior key word product profile correlations at step 203 to develop the further inquiries to the purchaser or buyer to then revise the initial purchaser input product profile into a revised or first revised purchaser input product profile, as reflected at step 205. The seller product information database of product profiles 201 is then accessed with the revised purchaser input product profile and a second comparing of the first revised purchaser input product profile to the plurality of product specification profiles in the seller product information database is performed, as illustrated in FIG. 6.

It will be appreciated by those of ordinary skill in the art that the further inquiries may be based on one of knowledge based and historical based key word correlations related to the initial purchase input product profile and successful product matches. If upon accessing the seller product information database with the revised purchaser input product profile, there are one or more successful product matches of the first revised purchaser input product profile to at least one of the plurality of product specification profiles in the seller product information database, the matches are then displayed as shown in step 202.

If instead there are no matches from the second comparing, storing the first revised purchaser input product profiles in a purchaser product profile database as shown in step 206 and providing access by potential sellers to the purchaser product profile database to allow possible later seller generated product matches, as illustrated in step 207.

FIG. 7 is a flowchart furthering the embodiment illustrated in FIG. 6, and illustrates one embodiment of an exemplary flow wherein a product profile word to product match index may be created. FIG. 7 illustrates at step 220 how a successful product profile word match to a product is made. The data from that successful match and the correlated success is then input or stored in the product profile word to product match index at step 221 to later then serve as an index to be utilized for future or later key word searches for products. If a later purchaser input product profile is received and there is no initial match in the seller input product specification profiles (item 201 in FIG. 6), then step 224 accesses the product profile word to product match index with the new product profile key words to determine if the key words can be correlated to prior similar or the same key words which eventually resulted in a successful product match. It will be appreciated by those of ordinary skill in the art that the match index may reside without limitation in storage media, processing circuitry, hardware storage media or hardware processing circuitry.

If at step 226 it is determined there are no successful product matches of the first revised product profile at step 227, then the product profile word to product match index with the first revised product profile to determine if the revised key words can be correlated to prior similar or the same key words which eventually resulted in a successful product match. If there is no match of the second revised product profile, then at step 227 the second revised product profile is stored and at step 228 access is provided to potential sellers to search the second revised product profile.

Those of ordinary skill in the art will recognize that the buyers and sellers may access the system or interact from mobile devices, wireless, and all traditional mechanisms, with no one in particular being required to practice this invention.

Figure 8B:
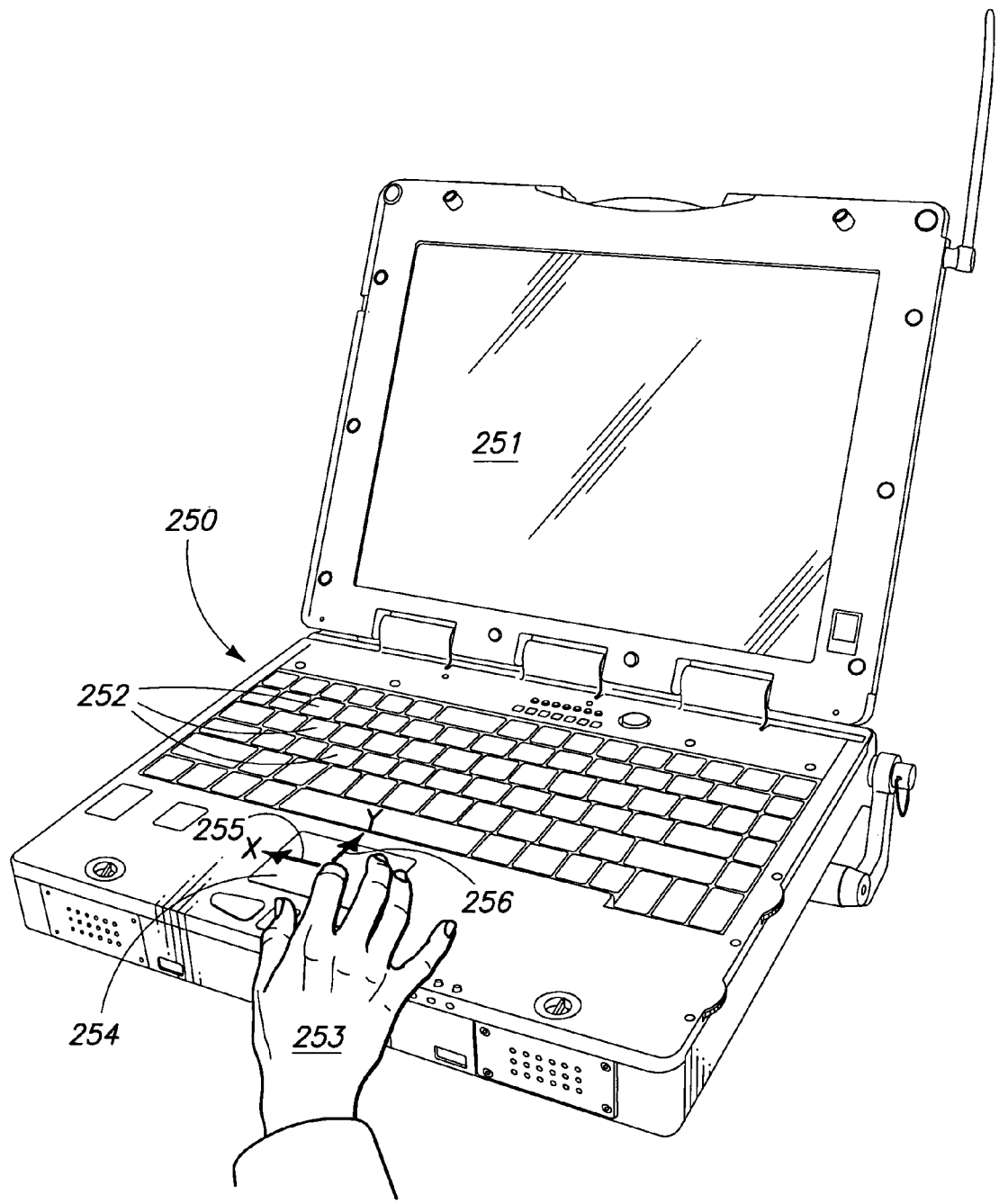
FIG. 8 is a perspective view of a user using a touch pad on a traditional laptop computer which also includes a keyboard.

FIG. 8 is a perspective view of a user 253 using a touch pad 254 on a traditional laptop computer 250, which also includes a keyboard 252 and a display 251 or monitor. The laptop 250 may be the access point or even considered in some embodiments a communication interface to the system. In other embodiments this invention will provide the communication interface which may be represented by a box or step for example item 161 on FIG. 4.

As will be appreciated by those of reasonable skill in the art, there are numerous embodiments to this invention, and variations of elements and components which may be used, all within the scope of this invention.

In a process embodiment for example, a method of providing a purchaser specified product search engine may be provided and that method may comprise: providing a seller product information database which includes a plurality of product specification profiles, wherein the seller product information database comprises at least one of seller input product specification profiles and world wide web derived product specification profiles; receiving initial purchaser input product profile; accessing the seller product information database and performing a first comparing of the initial purchase input product profile to the plurality of product specification profiles in the seller product information database; determining if there is one or more product matches between the initial purchaser input product profile and at least one of the plurality of product specification profiles in the seller product information database; if there are one or more successful product matches of the initial purchase input product profile to at least one of the plurality of product specification profiles in the seller product information database, displaying the one or more successful product matches; if there are no matches from the first comparing, submitting further inquiries to develop a first revised purchaser input product profile, wherein the further inquiries are based on one of knowledge based and historical based key word correlations related to the initial purchase input product profile and successful product matches; accessing the seller product information database and performing a second comparing of the first revised purchaser input product profile to the plurality of product specification profiles in the seller product information database; if there are one or more successful product matches of the first revised purchaser input product profile to at least one of the plurality of product specification profiles in the seller product information database, displaying the one or more successful product matches; if there are no matches from the second comparing, storing the first revised purchaser input product profiles in a purchaser product profile database; and providing access by potential sellers to the purchaser product profile database to allow possible later seller generated product matches.

A further embodiment to that in the preceding paragraph may be such a method and yet further comprising: creating a dynamic index which correlates prior input product profile to successful product matches; receiving a second purchaser input product profile; accessing the seller product information database and performing a first comparing of the second purchaser input product profile to the plurality of product specification profiles in the seller product information database; determining if there is one or more product matches between the initial purchaser input product profile and at least one of the plurality of product specification profiles in the seller product information database; if there are no matches from the first comparing, accessing the dynamic index to correlate the second purchaser input product profile to similar prior input product profile correlated to successful product matches; develop further inquiries to develop a revised second purchaser input product profile, wherein the further inquiries are based on the dynamic index which correlates prior input product profile to successful product matches; accessing the seller product information database and performing a second comparing of the revised second purchaser input product profile to the plurality of product specification profiles in the seller product information database; if there are one or more successful product matches of the first revised purchaser input product profile to at least one of the plurality of product specification profiles in the seller product information database, displaying the one or more successful product matches; if there are no matches from the second comparing, storing the second purchaser input product profile in the purchaser product profile database; and providing access by potential sellers to the purchaser product profile database to allow possible later seller generated product matches to the second purchaser input product profile.

Other or additional methods from either of the methods in the preceding two paragraphs may further include or comprise any of the following alone or in combination: further providing a transaction completion mechanism to allow the purchaser to make a purchase from one or more of the successful matches displayed; further wherein the transaction completion mechanism provides contact information; further comprising providing a purchaser financial commitment wherein the purchaser; further wherein the purchaser financial commitment comprises an escrow of funds to be applied toward the transaction completion mechanism; further wherein providing a purchaser financial commitment is part of the purchaser input product profile and/or further wherein the further inquires are used to develop a first revised purchaser input product profile are further based on prior successful matches of prior similar initial and revised purchaser input product profile to the plurality of product specification profiles.

In yet another embodiment, a data processing apparatus may be provided for a prospective product purchaser to search for and locate a specified product, the data processing apparatus comprising: a communication interface; hardware storage circuitry including a seller product information database which includes a plurality of product specification profiles, wherein the seller product information database comprises at least one of seller input product specification profiles and world wide web derived product specification profiles; receiving initial purchaser input product profile; accessing the seller product information database and performing a first comparing of the initial purchase input product profile to the plurality of product specification profiles in the seller product information database; determining if there is one or more product matches between the initial purchaser input product profile and at least one of the plurality of product specification profiles in the seller product information database; if there are one or more successful product matches of the initial purchase input product profile to at least one of the plurality of product specification profiles in the seller product information database, displaying the one or more successful product matches; if there are no matches from the first comparing, submitting further inquiries to develop a first revised purchaser input product profile, wherein the further inquiries are based on one of knowledge based and historical based key word correlations related to the initial purchase input product profile and successful product matches; accessing the seller product information database and performing a second comparing of the first revised purchaser input product profile to the plurality of product specification profiles in the seller product information database; if there are one or more successful product matches of the first revised purchaser input product profile to at least one of the plurality of product specification profiles in the seller product information database, displaying the one or more successful product matches; if there are no matches from the second comparing, storing the first revised purchaser input product profiles in a purchaser product profile database; and providing access by potential sellers to the purchaser product profile database to allow possible later seller generated product matches.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of providing a purchaser specified product search engine, comprising:
  providing a seller product information database which includes a plurality of product specification profiles, wherein the seller product information database comprises at least one of seller input product specification profiles and world wide web derived product specification profiles;
  receiving an initial purchaser input product profile;
  accessing the seller product information database and performing a first comparing of the initial purchaser input product profile to the plurality of product specification profiles in the seller product information database;
  determining if there are one or more product matches between the initial purchaser input product profile and at least one of the plurality of product specification profiles in the seller product information database;
  if there are one or more successful product matches of the initial purchaser input product profile to at least one of the plurality of product specification profiles in the seller product information database, displaying the one or more successful product matches;
  if there are no matches from the first comparing, submitting further inquiries to develop a first revised purchaser input product profile, wherein the further inquiries are based on one of knowledge based and historical based key word correlations related to the initial purchaser input product profile and successful product matches;
  accessing the seller product information database and performing a second comparing of the first revised purchaser input product profile to the plurality of product specification profiles in the seller product information database;
  if there are one or more successful product matches of the first revised purchaser input product profile to at least one of the plurality of product specification profiles in the seller product information database, displaying the one or more successful product matches;
  if there are no matches from the second comparing, storing the first revised purchaser input product profiles in a purchaser product profile database; and
  providing access by potential sellers to the purchaser product profile database to allow possible later seller generated product matches.

2. A method of providing a purchaser specified product search engine as recited in claim 1, and further providing a transaction completion mechanism to allow the purchaser to make a purchase from one or more of the successful matches displayed.

3. A method of providing a purchaser specified product search engine as recited in claim 1, and further wherein the transaction completion mechanism provides contact information.

4. A method of providing a purchaser specified product search engine as recited in claim 1, and further comprising providing a purchaser financial commitment wherein the purchaser commits an amount of money toward the transaction completion mechanism.

5. A method of providing a purchaser specified product search engine as recited in claim 4, and further wherein the purchaser financial commitment comprises an escrow of funds to be applied toward the transaction completion mechanism.

6. A method of providing a purchaser specified product search engine as recited in claim 4, and further wherein providing a purchaser financial commitment is part of the purchaser input product profile.

7. A method of providing a purchaser specified product search engine as recited in claim 1, and further wherein the further inquires are used to develop a first revised purchaser input product profile are further based on prior successful matches of prior similar initial and revised purchaser input product profile to the plurality of product specification profiles in the seller product information database.

8. A method of providing a purchaser specified product search engine as recited in claim 1, and further comprising:
creating a dynamic index which correlates prior input product profile to successful product matches;
receiving a second purchaser input product profile;
accessing the seller product information database and performing a first comparing of the second purchaser input product profile to the plurality of product specification profiles in the seller product information database;
determining if there are one or more product matches between the initial purchaser input product profile and at least one of the plurality of product specification profiles in the seller product information database;
if there are no matches from the first comparing, accessing the dynamic index to correlate the second purchaser input product profile to similar prior input product profile correlated to successful product matches;
developing further inquiries to develop a revised second purchaser input product profile, wherein the further inquiries are based on the dynamic index which correlates prior input product profile to successful product matches;
accessing the seller product information database and performing a second comparing of the revised second purchaser input product profile to the plurality of product specification profiles in the seller product information database;
if there are one or more successful product matches of the first revised purchaser input product profile to at least one of the plurality of product specification profiles in the seller product information database, displaying the one or more successful product matches;
if there are no matches from the second comparing, storing the second purchaser input product profile in the purchaser product profile database; and
providing access by potential sellers to the purchaser product profile database to allow possible later seller generated product matches to the second purchaser input product profile.

9. A method of providing a purchaser specified product search engine as recited in claim 1, and after accessing the seller product information database and performing a first comparing of the initial purchase input product profile to the plurality of product specification profiles in the seller product information database, further providing feedback regarding the initial purchase input product profile provided.

10. A method of providing a purchaser specified product search engine as recited in claim 9, and further wherein the providing feedback includes feedback regarding terms utilized or terms which could have been utilized.

11. A method of providing a purchaser specified product search engine as recited in claim 10, and further wherein the providing feedback includes providing instruction regarding terms that may be utilized based on data contained in the seller product information database.

12. A data processing apparatus to provide a prospective product purchaser to search for and locate a specified product, the data processing apparatus comprising:
a communication interface;
hardware storage circuitry including a seller product information database which includes a plurality of product specification profiles, wherein the seller product information database comprises at least one of seller input product specification profiles and world wide web derived product specification profiles;
the communication interface and hardware storage circuitry being configured to:
receive an initial purchaser input product profile;
access the seller product information database and performing a first comparing of the initial purchaser input product profile to the plurality of product specification profiles in the seller product information database;
determine if there are one or more product matches between the initial purchaser input product profile and at least one of the plurality of product specification profiles in the seller product information database;
if there are one or more successful product matches of the initial purchaser input product profile to at least one of the plurality of product specification profiles in the seller product information database, being further configured to display the one or more successful product matches;
if there are no matches from the first comparing, being further configured to submit further inquiries to develop a first revised purchaser input product profile, wherein the further inquiries are based on one of knowledge based and historical based key word correlations related to the initial purchase input product profile and successful product matches;
configured to access the seller product information database and performing a second comparing of the first revised purchaser input product profile to the plurality of product specification profiles in the seller product information database;
if there are one or more successful product matches of the first revised purchaser input product profile to at least one of the plurality of product specification profiles in the seller product information database, being further configured to display the one or more successful product matches;
if there are no matches from the second comparing, being further configured to store the first revised purchaser input product profiles in a purchaser product profile database; and
being configured to provide access by potential sellers to the purchaser product profile database to allow possible later seller generated product matches.

* * * * *